United States Patent [19]

Harrison

[11] 4,258,702
[45] Mar. 31, 1981

[54] VANES FOR SOLAR HEATING

[75] Inventor: Henry Harrison, Locust Valley, N.Y.

[73] Assignee: Halm Instrument Co., Inc., Glen Head, N.Y.

[21] Appl. No.: 599,379

[22] Filed: Jul. 28, 1975

[51] Int. Cl.³ .............................................. F24J 3/02
[52] U.S. Cl. .................................. 126/439; 350/292; 350/293
[58] Field of Search ................ 126/270, 271; 350/292, 350/293, 299, 258; 160/236; 350/259–264

[56] References Cited

U.S. PATENT DOCUMENTS

| | | | |
|---|---|---|---|
| 1,338,644 | 4/1920 | Cartter et al. | 126/271 |
| 1,661,473 | 3/1928 | Goddard et al. | 126/271 |
| 2,595,905 | 5/1952 | Telkes | 126/270 |
| 2,969,788 | 1/1961 | Newton | 126/271 |
| 3,108,279 | 10/1963 | Eisentraut | 350/292 |
| 3,125,091 | 3/1964 | Sleeper, Jr. | 126/271 |
| 3,285,333 | 11/1966 | Johnson, Jr. | 126/270 |
| 3,438,699 | 4/1969 | Seeger | 350/261 |
| 3,709,583 | 1/1973 | Pfannkuch | 350/260 |
| 3,980,071 | 9/1976 | Barber, Jr. | 126/271 |
| 3,985,116 | 10/1976 | Kapany | 126/270 |

FOREIGN PATENT DOCUMENTS

| | | | |
|---|---|---|---|
| 1906990 | 5/1970 | Fed. Rep. of Germany | 350/264 |
| 653295 | 2/1963 | Italy | 126/270 |

Primary Examiner—James C. Yeung
Attorney, Agent, or Firm—James P. Malone

[57] ABSTRACT

Uni-directional radiation vanes for a solar heating system for passing solar radiation and suppressing reradiation in the opposite direction. A plurality of parallel vanes are pivotally mounted. Drive means are connected to the vanes to rotate said vanes in parallel relation to follow the sun so that the sun's rays pass between said vanes. A plurality of grooves on the lower part of said vanes suppress reradiation between said vanes in the opposite direction to the sun's rays.

12 Claims, 6 Drawing Figures

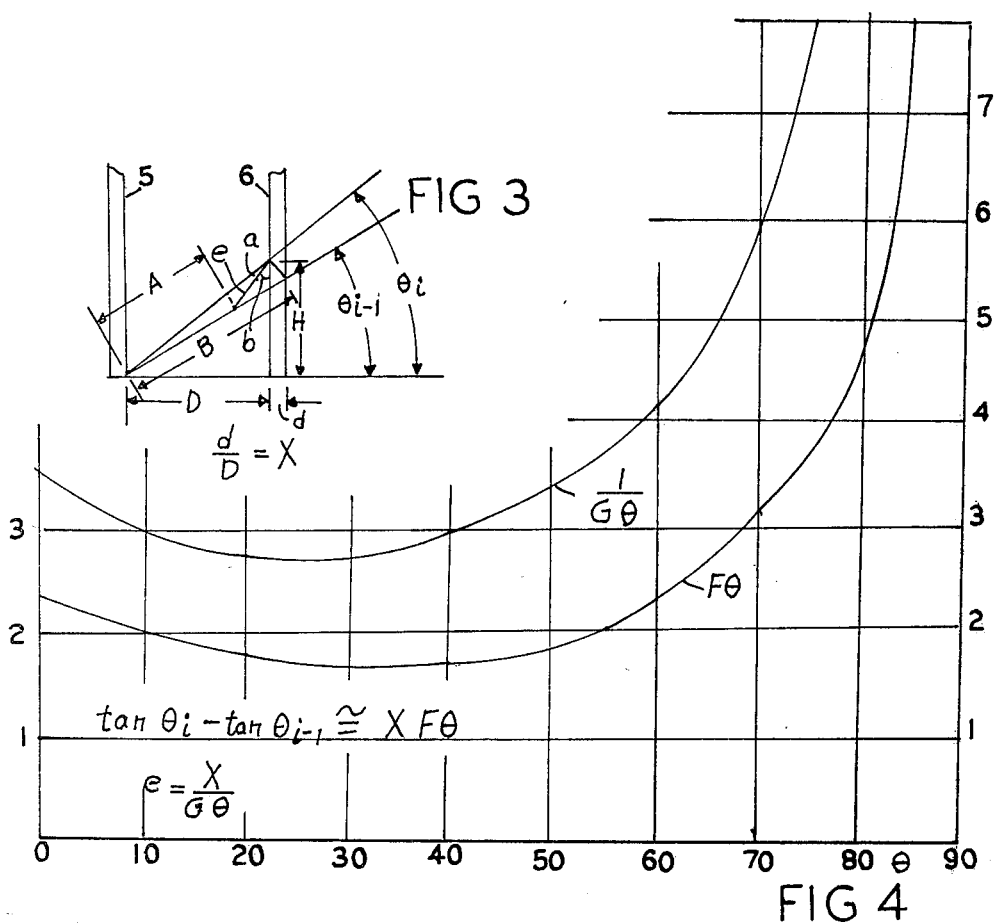
FIG 3
FIG 4
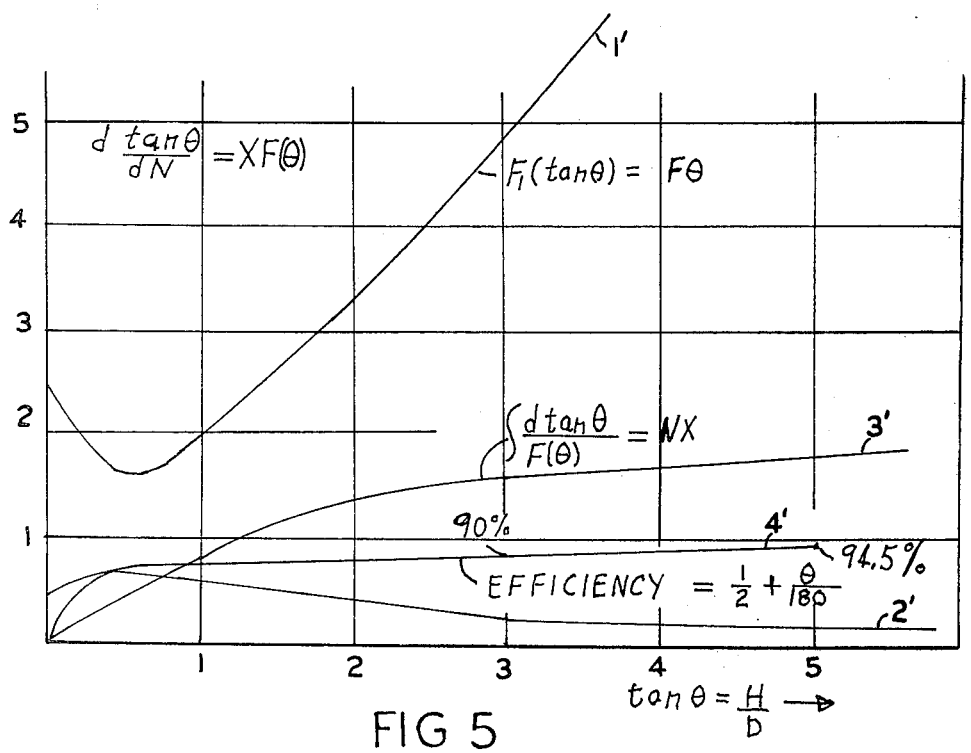
FIG 5

VANES FOR SOLAR HEATING

This invention relates to solar heating and more particularly to vanes for passing solar rays in one direction and suppressing reradiation in the opposite direction.

In solar heating systems, radiation from the sun, both visible and infra-red falls on an absorbing surface, or collector plate, where it is converted into heat, and raises the temperature of the collector plate. This heat is delivered either directly, or by some circulating fluid system, to a heat load or to a heat storage device. The usefulness of the delivered heat is much greater for many purposes if it is delivered at a high temperature. Heat may escape from the collector plate by conduction and convection, and especially by reflection of incident sunlight and reradiation to the sky from the hot surface. It is a primary purpose of this invention to permit direct sunlight to fall on a collecting plate while preventing the escape of reflected sunlight and heat radiation from the plate.

The present invention solves this problem by providing a plurality of parallel vanes mounted in front of the collector plate in such a way that the collimated light from the sun passes freely between them. Radiation which is reflected from the collector plate is generally not parallel to the vanes and reradiation of infrared heat waves is also not parallel to the vanes, since it is uniformly distributed over the entire $2\pi$ sterradians in front of the collector plate. The side surfaces of the vanes are grooved with reflecting surfaces which reflect substantially all the radiation which strikes them back to the collector plate. Thus nearly all of the reflected sunlight and heat radiation is prevented from leaving the plate.

It will be evident that some means must be provided for orienting the vanes parallel to the incident rays of sunlight. While this can be done by tilting the entire collector plate assembly, a preferred arrangement is to pivot the vanes so they can be individually tilted and like them so that they always remain parallel to each other. This preferred arrangement has the advantage of allowing the collector assembly to be mounted in substantially fixed position.

Although a right angle plane catadioptic reflector system, returning incident radiation in the opposite direction, as projected on a plane perpendicular to the axis of the system, would throw back light and heat radiation reflected and reradiated from the collector plate, each ray would suffer two reflections with losses at each reflection. Therefore, the cylindrical groove configuration described in this disclosure, which reflects each ray with only a single reflection is preferred.

Accordingly, it is a principal object of this invention to provide new and improved solar heating means in which the losses caused by partial reflection and heat reradiation at the collector surface are substantially eliminated.

Another object of this invention is to provide vanes arranged in parallel, and having reflecting groove surfaces in their faces, such that specular radiation parallel to the vanes can pass freely between them, but returning radiation which strikes the vanes is thrown back toward the collecting surface.

Another object of this invention is to provide a reflecting groove surface configuration which turns back radiation with only a single reflection, for greatest efficiency.

Another object of this invention is to provide a system of vanes which can be oriented parallel to the sun's rays.

Still another object is to provide a system of vanes which can be oriented parallel to the sun's rays while the collector assembly remains mounted in a fixed position.

Another object is to provide a system of vanes which can be tilted with respect to the rays of the sun, so that substantially all the radiation striking the vanes is reflected back and thereby prevented from reaching the collector surface at times when no solar heating is desired.

These and other objects of the invention will be apparent from the following specification and drawings of which:

FIG. 3 is a diagram illustrative of the theory of the invention.

FIGS. 4 and 5 are graphs showing the results of the theoretical calculations.

Figure 1:
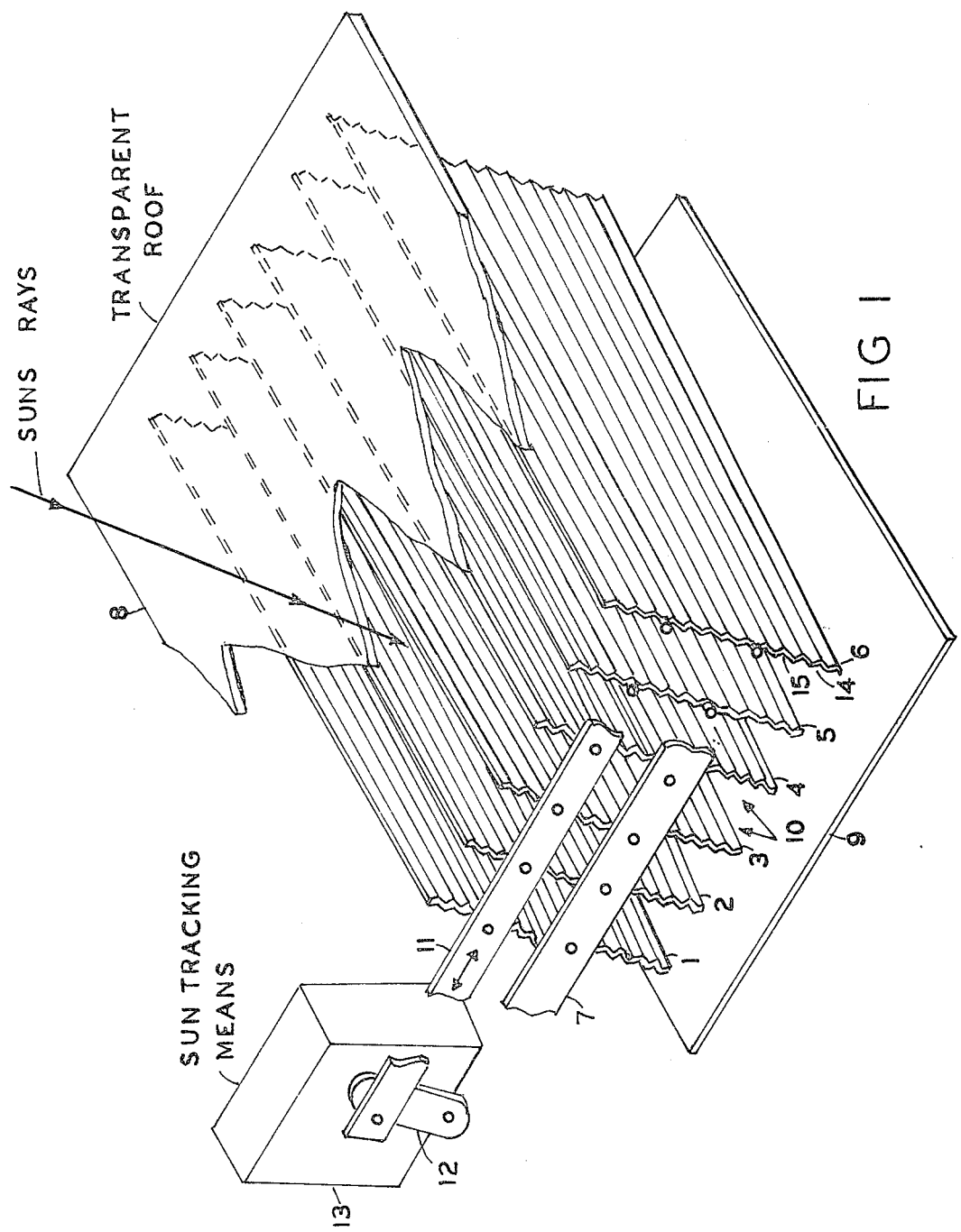
FIG. 1 is a perspective view of an embodiment of the invention.

In order to have a reasonably precise reflection at the narrow curved reflecting surfaces of the grooves, the groove depth should be at least several wavelengths of infrared radiation. Since a typical heat wave may have a wavelength of $20 \times 10^{-6}$ meters, the groove depth should be not less than $10^{-4}$ meter or 0.004 inch. To some degree, the grooves on opposite sides of a vane can be nested to reduce the overall thickness of the vane to be less than twice the depth of the groove.

The efficiency of this vane system in returning diffuse reradiated heat waves is measured by the proportion of the rays which strikes the reflecting surfaces. Since rays are equally likely to be emitted in every equal increment of solid angle above the collector surface, the plane angle through which rays are emitted is 180°, while the aperture angle through which they may escape without striking the reflecting surfaces is about $$180° / \frac{D}{\pi H},$$

H being the height of the groove pattern. Thus the proportion of rays which cannot escape is about $D/\pi H$.

A vane system according to this invention in which a second series of reflecting grooves, oppositely directed, is provided near the outer edge of the vanes, has the capacity to reflect back light rays which are not parallel to the vanes. Thus when the vanes are tilted to a sufficient angle with respect to the incoming rays of the sun, the sunlight is prevented from entering the collecting system.

When the vanes are tilted with respect to the surface of the collector plate, a small amount of the light from the collector surface striking the curved sufaces on one vane will be intercepted by the grooved surfaces of the opposite vane, where it will be scattered in a disorganized way. Little of this scattered light will find its way back out through the opening D before being absorbed by multiple reflections. However, this has no effect on the direct rays of sunlight, as long as they are parallel to the vanes.

The grooves are preferably made equally deep and as deep as practical consistent with the thickness of the vanes. This means that the width of the grooves will vary. The radius of the reflecting surfaces of the grooves also varies and must be computed to reflect a grazing ray 18, FIG. 2, striking the surface 22, for example, into the extreme position 18'. It must also reflect the extreme ray 17, at surface 22, back on itself along the direction 17'. Both these conditions can be met if the surface 22 is a circular cylinder. Furthermore, it will be seen that any upward ray through opening D which strikes surface 22 will then be reflected downward through the opening D. If all other reflecting groove surfaces, such as 20 and 21, for example, are similarly defined, then all the rays, such as 16, passing upward through opening D which will strike the reflecting surfaces of vanes 5 and 6 will be reflected to pass back downward through opening D.

To a person skilled in the design of optical systems, it will be evident that a slightly non-circular cylindrical surface could be used in place of the circular cylindrical surface described herein, but since there appears to be no important advantage, the less complex circular cylindrical surface is preferred.

Because optical reflecting surfaces may be degraded by exposure to the weather, it may be preferred to protect the vanes by a transparent cover. Protection of the collector surface, however, is better accomplished by a transparent cover behind the vanes, because then the reflected light and reradiated infrared from the cover are thrown back by the vanes.

Referring to the embodiment shown in FIG. 1, the device generally comprises a plurality of parallel vanes 1-6 which are pivotally mounted on the stationary member 7. The vane assembly is mounted under a transparent cover 8, such as glass. Mounted underneath the vane assembly is a heat collector 9.

The purpose of the vane assembly is to permit the sun's rays to pass between the vanes and impinge upon the heat collector 9. The problem solved by the invention is the suppression of reradiation from the heat collector 9, shown by the arrows 10. The object of the invention is to suppress this reradiation by reflection so that it does not pass up between the vanes and pass out through the glass cover 8.

Means are provided to tilt the vanes to follow the sun so that the sun's rays will pass directly between the vanes. These means comprise member 11 which is pivotally connected to each of the vanes and which is activated by a lever 12 which is actuated by means 13, which moves the member 11 so as to track the sun. The means 13 may incorporate a sun detecting device and a servo mechanism, or it may comprise a clock mechanism. Alternatively, the sun's rays may be tracked manually by making periodic adjustments manually.

The reradiation is suppressed by means of the grooves 14, 15, etc., which are cut or otherwise impressed in the vanes 1-6.

Figure 2:
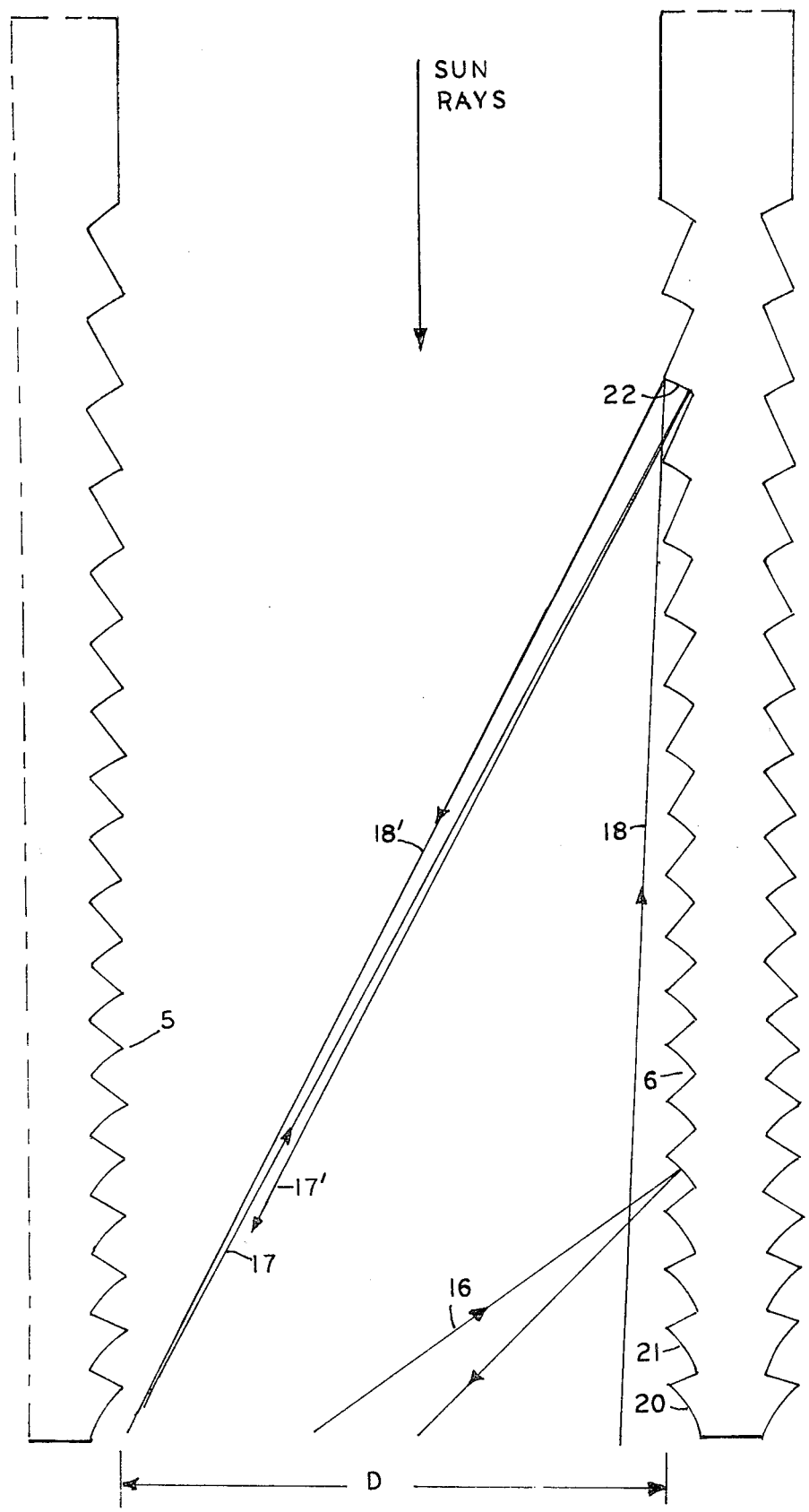
FIG. 2 is an enlarged detail view illustrating the operation of the invention.

FIG. 2 shows how the vanes trap and reflect back the reradiation illustrated by the arrows 16, 17 and 18. The reradiation or reflection from the heat collector 9 is random in nature and so may occur at any angle. It is desired that all of the reradiation be reflected back in the downward direction through the aperture D between the vanes. This can be accomplished for substantially all the reradiation by properly choosing the radii of the grooves 20, 21, 22, etc., as will be discussed in connection with FIG. 3.

FIG. 3 is a diagram illustrating the theory of choosing the radii of the grooves of the vanes for optimum suppression of the reradiation.

Referring to FIG. 3. $(d/D)=X$

Let $D=1$ then $d=X$

Radius of reflecting surface of the i th groove $=e_i$ $$\frac{1+X}{\cos(\theta_i-1)} = \text{diagonal length } B$$

$$\frac{1+X}{\cos\theta_i-1} - e_i = \text{diagonal length } A$$

$$\begin{cases} A\sin\theta_i-1 + e_i\cos b = \tan\theta_i & \text{(vertical equation)} \\ b = \dfrac{90-\theta_i}{2} = a & \text{(angle of incidence equals angle of reflection)} \\ A\cos\theta_i-1 + e_i\sin b = 1 & \text{(horizontal equation)} \end{cases}$$

By substitution, these three simultaneous equations reduce to two equations.

(Equation I)
$$\begin{cases} (1+X)\tan\theta_{i-1} - e_i\sin\theta_{i-1} + e_i\cos\dfrac{(90-\theta_i)}{2} = \tan\theta_i \\ (1+X) - e_i\cos\theta_{i-1} + e_i\sin\dfrac{90-\theta_i}{2} = 1 \end{cases}$$

These two simultaneous equations can be solved to eliminate $e_i$.

$$\begin{cases} (1+X)\tan\theta_{i-1}(-\cos\theta_{i-1} + \sin\dfrac{90-\theta_i}{2}) \\ + e_i(-\sin\theta_{-1} + \cos\dfrac{90-\theta_i}{2}) \cdot (-\cos\theta_{i-1} + \sin\dfrac{90-\theta_i}{2}) \\ = \tan\theta_i(-\cos\theta_{i-1} + \sin\dfrac{90-\theta_i}{2}) \\ (1+X)(-\sin\theta_{i-1} + \cos\dfrac{90-\theta_i}{2}) \\ + e_i(-\sin\theta_{i-1} + \cos\dfrac{90-\theta_i}{2}) \cdot (-\cos\theta_{i-1} + \sin\dfrac{90-\theta_i}{2}) \\ = (-\sin\theta_{i-1} + \cos\dfrac{90-\theta_i}{2}) \end{cases}$$

Subtracting the second of the above equations from the first eliminates $e_i$.

$$(1+X)\tan\theta_{i-1}(-\cos\theta_{i-1} + \sin\dfrac{90-\theta_i}{2}) -$$
$$(-\sin\theta_{i-1} + \cos\dfrac{90-\theta_i}{2}) =$$
$$\tan\theta_i(-\cos\theta_{i-1} + \sin\dfrac{90-\theta_i}{2}) -$$
$$(-\sin\theta_{i-1} + \cos\dfrac{90-\theta_i}{2})$$

$$(1+X)\tan\theta_{i-1}(-\cos\theta_{i-1} + \sin\dfrac{90-\theta_i}{2}) -$$
$$X(-\sin\theta_{i-1} + \cos\dfrac{90-\theta_i}{2}) =$$
$$\tan\theta_i(-\cos\theta_{i-1} + \sin\dfrac{90-\theta_i}{2})$$

$$(1+X)\tan\theta_{i-1} - X\dfrac{(-\sin\theta_{i-1} + \cos\dfrac{90-\theta_i}{2})}{-\cos\theta_{i-1} + \sin\dfrac{90-\theta_i}{2}} = \tan\theta_i$$

This implicit expression affords a means of computing $\theta_i$ by trial and error from $\theta_{i-1}$. However, a further simplification is possible when X is small.

Using the trigonometric identities $$\cos\frac{90}{2} - \frac{\theta_i}{2} = \cos 45° \cos\frac{\theta_i}{2} + \sin 45° \sin\frac{\theta_i}{2} = \frac{\sqrt{2}}{2}\cos\frac{\theta_i}{2} + \frac{\sqrt{2}}{2}\sin\frac{\theta_i}{2}$$

$$\sin\frac{90}{2} - \frac{\theta_i}{2} = \sin 45° \cos\frac{\theta_i}{2} - \cos 45° \sin\frac{\theta_i}{2} = \frac{\sqrt{2}}{2}\cos\frac{\theta_i}{2} - \frac{\sqrt{2}}{2}\sin\frac{\theta_i}{2}$$

$$\tan\theta_i - \tan\theta_{i-1} = X\left[\tan\theta_{i-1}\left\{\frac{-2\sin\frac{\theta_{i-1}}{2}\cos\frac{\theta_{i-1}}{2} + \frac{2}{2}(\cos\frac{\theta_{i-1}}{2} + \sin\frac{\theta_{i-1}}{2})}{-\cos^2\frac{\theta_{i-1}}{2} + \sin^2\frac{\theta_{i-1}}{2} + \frac{2}{2}(\cos\frac{\theta_{i-1}}{2} - \sin\frac{\theta_{i-1}}{2})}\right\}\right]$$

Since $\theta_i - \theta_{i-1}$ is a small number of order X, it is a good approximation to set $\theta_i = \theta_{i-1} = \theta$ in the right hand side of the equation. Then the equation becomes:

$$(\tan\theta_i - \tan\theta_{i-1}) = X(\tan\theta - \frac{2\sin\frac{\theta}{2}\cos\frac{\theta}{2} + \frac{\sqrt{2}}{2}(\cos\frac{\theta}{2} + \sin\frac{\theta}{2})}{-\cos^2\frac{\theta}{2} + \sin^2\frac{\theta}{2} + \frac{\sqrt{2}}{2}(\cos\frac{\theta}{2} - \sin\frac{\theta}{2})}) = X F(\theta),$$

wherein the width of a groove, $\tan\theta_i - \tan\theta_{i-1}$, is written approximately as a continuous function of $\theta$ and the groove depth X. This affords a relatively direct method for computing successively a series of groove positions $\tan\theta_i$.

Now the same approximation can be applied to the computation of $e_i$, the radius of the $i_{th}$ reflecting surface. From Equation I $$1 + X - 1 = e_i(\cos\theta_{i-1} - \sin\frac{90 - \theta_i}{2})$$

$$X \frac{1}{\cos\theta_{i-1} - \sin\frac{90 - \theta_i}{2}} = e_i$$

As before, $\theta_{i-1} = (\text{approx.}) \theta_i = \theta$, so $$e_i - e = X \frac{1}{\cos\theta - \sin\frac{90 - \theta}{2}} = X \frac{1}{G(\theta)}, \text{ where } \frac{1}{G(\theta)} \text{ is a}$$

continuous function of $\theta$.

The continuous functions $F(\theta)$ and $1/G(\theta)$ from which $\tan\theta_i - \tan\theta_{i-1}$ and $e_i$ can be computed are plotted in FIG. 4.

FIG. 5 shows derived curves from which N, the number of grooves for a given efficiency can be found once the groove depth X is specified. In the limit of small grooves, $\Delta \tan\theta$ becomes $(d\tan\theta/d N) = X F(\theta)$. To integrate this equation, $F(\theta)$ has been replotted as $F_1(\tan\theta)$ in curve 1' in FIG. 5, and $(1/F_1(\tan\theta))$ in curve 2. The area under curve 2' is $$\int \frac{d\tan\theta}{F_1(\tan\theta)} = XN.$$

plotted as curve 3'.

Finally, the efficiency of the radiation loss suppression $$1 - \frac{D}{\pi H} = 1 - \frac{1}{\pi\tan\theta}$$

is plotted as curve 4'.

Figure 6:
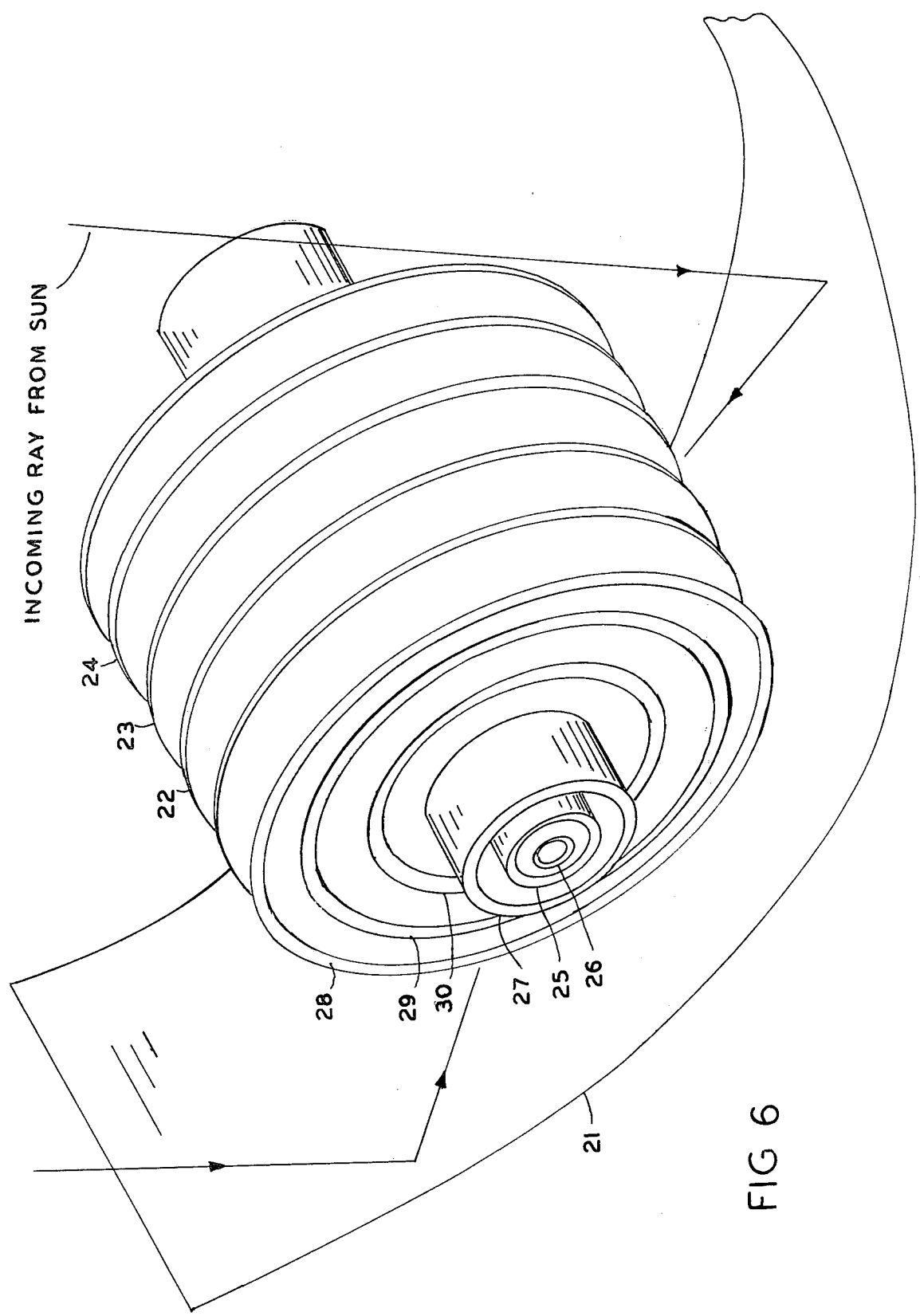
FIG. 6 is a perspective view of another embodiment of the invention.

Referring to FIG. 6, it is not necessary that the collector surface be a flat plate, nor is it necessary that the incoming radiation be collimated. If the collector 25 surface is a cylindrical tube at the focus of a cylindrical reflector 21, the vanes may take the form of concentric discs, 22, 23, 24, etc., and the reflecting surfaces 28, 29, 30, then are toroidal surfaces of concentric grooves in the faces of the discs. When the collector axis is oriented perpendicular to the rays from the sun, the rays focused on the collector surface are substantially radial and perpendicular to the collector axis. Thus, they pass freely between The disc-shaped vanes but scattered light and reradiated infrared strike the vanes and are thrown back by the toroidal groove reflecting surfaces. The collector 25 is covered by transparent cylindrical cover 27. The heat may be extracted by means of water pipe 26.

There are many possible further variations of optical systems in which this vane system could be employed to advantage. The only requirement is that all the rays of the pencil of rays arriving at each point of the collector surface must be substantially parallel to one of a family of vane surfaces.

I claim:

1. A plurality of thin vanes having inner edges and outer edges said vanes mounted in parallel planes, and spaced apart to permit free passage between the vanes of light and infrared radiation parallel to said vanes, and a plurality of contoured reflecting surfaces on a portion of said vanes near said inner edges, said reflecting surfaces comprising surface elements angled with respect to said parallel planes and closely spaced so that they reflect substantially all light and infrared rays from the spaces between said inner edges which strike said portion of said vane back through the space between said inner edges by a single reflection.

2. Apparatus as in claim 1, in which additional grooved reflecting surfaces are provided near said outer edges which permit free passage of light and infrared radiation rays parallel to said vanes, but reflect back substantially all light and infrared radiation rays from the spaces between said outer edges which strike said additional grooved surfaces, back through the spaces between said outer edges by a single reflection.

3. In solar heating means apparatus according to claim 1, collector means connected to said vanes which absorbs radiation from the sun and means for orienting said parallel vane means parallel to the rays of sunlight, whereby direct sunlight can pass freely between said parallel vanes but reflected light and infrared radiation rays from the collecting means which strike the said grooved surfaces are reflected back to the said collecting means.

4. Apparatus according to claim 3, having a cylindrical light-focusing reflector which directs the rays of the sun through between said parallel vane means, and said collecting means is of substantially circular cylindrical configuration substantially at the focus of said focusing reflector, and said parallel vane means are portions of concentric circular ring discs, and said grooved reflecting surfaces are formed by a series of circular grooves substantially concentric with said collector means.

5. Apparatus according to claim 4, in which said collecting means is a flat plate, and said parallel vane means are flat vanes, and said grooved reflecting surfaces are a series of grooves substantially parallel to the inner edges of said vanes.

6. Apparatus according to claim 5, in which said collector means remains fixed and said vane means are pivotally supported and pivotally linked together for parallel motion.

7. Apparatus according to claim 6, having a light-transparent cover.

8. Apparatus according to claim 3, in which said collector means includes at least one transparent cover through which sunlight passes after it passes through between the parallel vane means.

9. Apparatus according to claim 3, including additional grooved reflecting surfaces provided near said outer edges, which permit free passage of light and infrared radiation rays parallel to said vanes, but reflect back substantially all light and infrared radiation rays from the spaces between said outer edges which strike said additional grooved reflecting surfaces back through the spaces between said outer edges, and means for orienting said vanes so that the incident rays of sunlight strike said additional grooved reflecting surfaces, whereby substantially all of the incident sunlight is reflected back through the spaces between said outer edges of said vanes.

10. Apparatus according to claim 1, in which said grooved reflecting surfaces are formed of a series of straight parallel grooves each having a circular cylindrical reflecting surface of suitable radius and center of curvature, whereby substantially all said rays from the spaces between said inner edges which strike said reflecting surfaces are reflected back through the spaces between said inner edges.

11. Apparatus according to claim 1, in which said grooved reflecting surfaces are a series of concentric circular grooves having a toroidal surface of suitable radius and center of curvature whereby substantially all said rays from the spaces between said inner edges which strike said reflecting surfaces are reflected back through the spaces between said inner edges.

12. A plurality of thin vanes mounted in parallel planes and spaced apart to permit free passage between the vanes of light and infrared radiation parallel to said vanes, and a plurality of contoured reflecting surfaces on each of said vanes, said reflecting surfaces comprising surface elements angled with respect to said parallel planes so that they reflect light and infrared rays which strike said reflecting surfaces back from between said vanes by a single reflection.

* * * * *